Feb. 17, 1970 E. S. PAGE 3,496,477

CLOCK PULSE FAILURE DETECTOR

Filed June 29, 1967

INVENTOR

E.S. PAGE

BY

Walter M. Hill

ATTORNEY

United States Patent Office 3,496,477
Patented Feb. 17, 1970

3,496,477

CLOCK PULSE FAILURE DETECTOR

Eugene S. Page, Elon College, N.C., assignor to Bell Telephone Laboratories, Incorporated, Murray Hill, N.J., a corporation of New York Filed June 29, 1967, Ser. No. 649,963
Int. Cl. H03k *5/18*
U.S. Cl. 328—120 4 Claims

ABSTRACT OF THE DISCLOSURE

A circuit for rapidly detecting the failure of a logic system clock in which the clock pulse is fed to two input ports of a passive network. One port is supplied directly from the clock while the other port is supplied from the clock through a half period delay circuit. If the clock should fail the output from the network promptly drops to zero to either activate an alarm or automatically substitute a stand-by clock.

BACKGROUND OF THE INVENTION

Clock failure detectors are useful in any logic system or communications system depending for its operation on master clock pulses.

Some prior art clock failure detector circuits depend upon a continuous comparison of the clock output with another clock or clocks with which it is normally phase locked. The detector circuit, itself, frequently involves active logic devices which are often of considerable complexity and inherently delay the detector response. Complex circuits, particularly those with active devices, are generally less reliable and tend to require more operating time than do simple circuits of passive elements. A good approach to greater simplicity is disclosed in the copending application of J. R. Hahn, Jr., Ser. No. 595,139, assigned to the assignee of the present application. In that application a circuit of optimum reliability required approximately one-fourth the clock period to detect a clock failure. While this time was quite short, there are instances where it would be very desirable to shorten still further the interval between clock failure and detection without incurring any appreciable loss of circuit reliability.

SUMMARY OF THE INVENTION

An exceedingly simple detector circuit is capable of rapidly detecting the failure of a logic system clock. The clock pulse is fed to two input ports of a passive network, each port being electrically isolated from the other. One port is supplied directly from the clock while the other port is supplied from the clock through a half period delay circuit. An output terminal on the network maintains a continuous voltage as long as the clock runs but this voltage promptly drops to zero if the clock should fail. This drop in voltage is utilized to either register the failure, activate an alarm or automatically substitute a stand-by clock.

BRIEF DESCRIPTION OF THE DRAWING

The invention may be better understood by reference to the accompanying drawings, in which.

DETAILED DESCRIPTION

Figure 1:
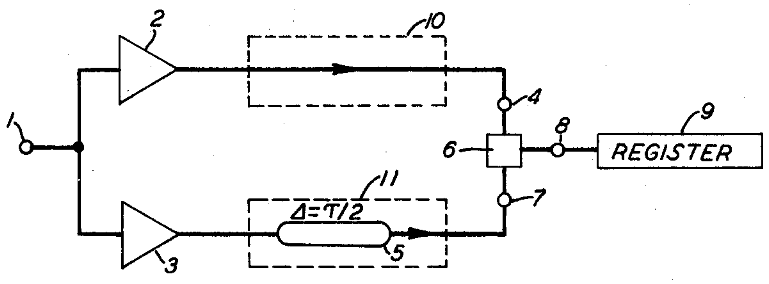
FIG. 1 discloses one preferred embodiment of the invention.

The circuit arrangement shown in FIG. 1 comprises an input terminal 1 to which a clock to be monitored may be connected. Driver amplifiers 2 and 3 are employed in the event the energy from the clock is at too low a level. The input circuits of these two amplifiers are connected to the clock terminal 1 and their output circuits are connected to transmission channels 10 and 11, respectively. A passive network 6 has a pair of input ports 4 and 7 which receive the clock pulses from the two transmission channels and convey them to the output terminal 8. The clock pulses transmitted through transmission channel 10 to input port 4 involve no appreciable delay whatever as represented by the single conductor comprising this transmission channel. However, transmission channel 11 contains a delay means 5 having a delay time $\Delta$ equal to one-half the clock period $\tau$. The passive network 6 must be so constructed that its input ports 4 and 7 are electrically isolated each from the other but a pulse applied to either of them is promptly transmitted to the output terminal 8.

The operation of the circuit structure of FIG. 1 will be such as to maintain a continuous pulse or voltage at the output terminal 8 so long as the clock is running. However, should the clock miss a pulse the voltage at terminal 8 will promptly drop to zero which will be indicated by a register 9 connected to this terminal. Of course it will be understood that in place of register 9 an alarm or other signal may be used or, alternatively, a changeover circuit may be activated which will substitute a stand-by clock for the one connected to input terminal 1. As these changeover circuits are now conventional in the art they need not be shown or described in this application.

Figure 5:
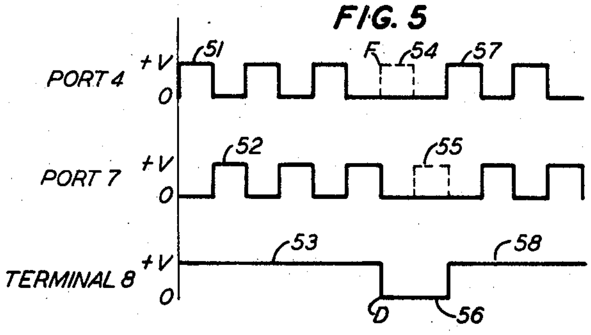
FIG. 5 shows the waveforms appearing at the three terminals of the passive network in either FIG. 1 or FIG. 4.

The voltage waveforms appearing at input ports 4 and 7 and at output terminal 8 are shown in FIG. 5. It may be assumed, for simplicity, that the waveform 51 appearing at input port 4 is exactly in phase with the clock pulse applied to terminal 1. This waveform is represented by an idealized rectangular wavetrain, each pulse of which varies between zero and +V volts. The waveform 52 of the pulses appearing at input port 7 are delayed exactly one-half clock period with reference to those appearing at port 4. This delay is, as previously mentioned, caused by the introduction of delay means 5 in the transmission channel 11. Since the passive network 6 will permit the ready transmission of either of these pulses to output terminal 8, this terminal will normally maintain a steady potential of +V volts as shown at 53 in FIG. 5. Let it be assumed that the clock has been running until the instant F that pulse 54 should have been produced but at this instant the clock fails to produce a pulse so that the voltage at port 4 remains zero. At this same instant the delayed pulse at port 7 is returning from +V volts to zero volts and since both input ports 4 and 7 are now at zero volts the voltage at the output terminal 8 promptly drops to zero as indicated by the negative-going pulse 56 beginning at instant D in FIG. 5. It may be noted that, under the conditions assumed, pulse 56 was initiated at the same instant F that the clock failed. Since pulse 54 is missing, delay pulse 55 will also be missing. It will be understood by those skilled in this art that if a transfer circuit, not shown, is caused to operate by the negative-going pulse 56, a stand-by clock can be immediately substituted to restore most of the missing pulse 54. If registration only is desired, register 9 will indicate this failure and should the clock resume, such as indicated by pulse 57, terminal 8 will again return to +V volts as indicated by portion 58 of the waveform shown in FIG. 5.

Figure 2:
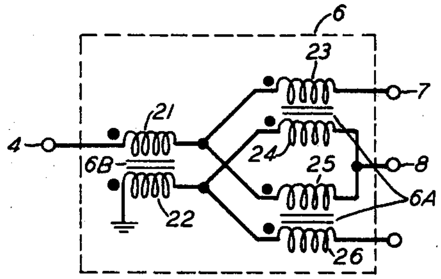
FIGS. 2 and 3 disclose the circuits of two hybrid coils, either of which may be used in the embodiment shown in FIG. 1.
Figure 3:
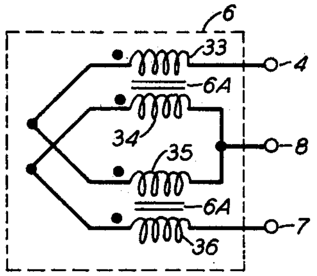

One type of passive network capable of performing the functions specified for network 6 is the conventional hybrid transformer or hybrid coil. Two such devices are shown in FIGS. 2 and 3 wherein the reference numerals 4, 7 and 8 correspond with the input ports and output terminal of network 6 shown in FIG. 1. FIG. 2 discloses a hybrid network comprising two separate cores 6A and 6B. Windings 21 and 22 are wound on core 6B while windings 23, 24, 25 and 26 are wound on core 6A. Each winding may be of an equal number of turns, their winding directions being indicated by the dots. While four windings are commonly wound on the core 6A, winding 26 is not used in the practice of this invention and its external terminal has been left unnumbered. It is a property of this type of transformer that, when terminated in the proper characteristic impedances, a pulse applied to either of the input ports 4 or 7 will appear only at output terminal 8, ports 4 and 7 being electrically isolated from each other.

The hybrid coil shown in FIG. 3 comprises a single core 6A with the four windings 33, 34, 35 and 36 wound thereon with an equal number of turns, their winding directions also being indicated by the dots. Insofar as the present invention is concerned, the properties of this network are the same as those described for FIG. 2.

Figure 4:
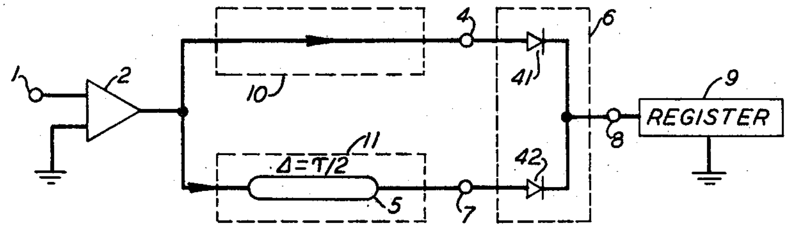
FIG. 4 discloses an alternative embodiment of the invention.

An alternative embodiment of the invention is shown in FIG. 4 in which only one driver amplifier 2 is used, its input circuit being connected to clock terminal 1. The output circuit of this amplifier is connected to both of the transmission channels 10 and 11 which are identical to those described for FIG. 1. The passive network 6, however, is considerably simplified and comprises a pair of diodes 41 and 42 connected as shown with diode 41 between input port 4 and output terminal 8 and diode 42 between input port 7 and output terminal 8. It will be apparent that a positive-going pulse applied to port 4 will appear at output terminal 8 and that diode 42 will isolate this pulse from input port 7. Similarly, a positive-going pulse applied to input port 7 will appear at output terminal 8 but will be isolated from input port 4 by diode 41. The circuit operation is otherwise identical to that described for FIG. 1 and the waveforms shown in FIG. 5 apply equally well to FIG. 4.

The invention has been described with reference to two specific embodiments of the invention and it will be apparent to those skilled in this art that various equivalent devices may be substituted for those specifically disclosed herein without departing from the scope of the invention.

What is claimed is:

1. A logic clock pulse failure detector circuit comprising a clock terminal to which a clock to be monitored may be connected to receive pulses from said clock, two transmission channels coupled to said clock terminal including means responsive to said pulses for developing in one of said channels a pulse train delayed substantially one-half period with reference to the pulses in the other channel, a network having two input ports and an output terminal, said network having means for electrically isolating said two ports from each other but readily transmitting to said output terminal pulses received at either port, and means connecting one of said ports to one of said channels and the other port to the other of said channels, whereby a substantially continuous voltage exists on said output termial only so long as clock pulses are regularly received at said clock terminal.

2. The combination of claim 1 wherein said network comprises a hybrid transformer.

3. The combination of claim 1 wherein said network comprises one diode connected between one of said input ports and said output terminals and a second diode connected between the other of said input ports and said output terminal.

4. The combination of claim 1 wherein said means responsive to said pulses comprises a delay circuit in series with one of said channels having a delay time equal to one-half the clock period.

References Cited

UNITED STATES PATENTS

| | | | |
|---|---|---|---|
| 3,100,875 | 8/1963 | Peterson | 329—128 X |
| 3,148,334 | 9/1964 | Danielsen et al. | 328—120 X |
| 3,244,986 | 4/1966 | Rumble | 307—232 X |
| 3,328,702 | 6/1967 | Brown | 328—120 X |

DONALD D. FORRER, Primary Examiner

R. L. WOODBRIDGE, Assistant Examiner

U.S. Cl. X.R.

307—231, 293; 328—55; 329—104; 340—146.1